United States Patent
Erb et al.

(10) Patent No.: US 10,988,044 B2
(45) Date of Patent: Apr. 27, 2021

(54) AUTOMATIC PLUG-AND-PAY WITH MULTI-FACTOR AUTHENTICATION FOR FUELING VEHICLES

(71) Applicant: Ford Global Technologies, LLC, Dearborn, MI (US)

(72) Inventors: Dylan Erb, Allen Park, MI (US); Alexander Bartlett, Wyandotte, MI (US); Jacob Wiles, Plymouth, MI (US); Bikram Singh, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/935,497

(22) Filed: Mar. 26, 2018

(65) Prior Publication Data

US 2019/0291589 A1 Sep. 26, 2019

(51) Int. Cl.
*B60L 53/65* (2019.01)
*B60L 53/66* (2019.01)
*G06Q 20/40* (2012.01)
*G06Q 50/06* (2012.01)

(52) U.S. Cl.
CPC ............ *B60L 53/665* (2019.02); *B60L 53/65* (2019.02); *G06Q 20/4014* (2013.01); *G06Q 50/06* (2013.01); *B60L 2230/16* (2013.01)

(58) Field of Classification Search
CPC .... B60L 53/665; B60L 53/65; B60L 2230/16; G06Q 20/4014; G06Q 50/06
See application file for complete search history.

(56) References Cited

U.S. PATENT DOCUMENTS

| | | | |
|---|---|---|---|
| 8,069,100 B2 | 11/2011 | Taylor et al. | |
| 9,165,319 B1* | 10/2015 | Henry | G06Q 30/0645 |
| 9,371,007 B1 | 6/2016 | Pendia et al. | |
| 2010/0161469 A1* | 6/2010 | Littrell | B60L 53/68 705/35 |
| 2012/0239571 A1* | 9/2012 | Boot | B60L 53/14 705/44 |
| 2013/0054457 A1* | 2/2013 | Strickland | B60L 53/65 705/44 |
| 2013/0262275 A1 | 10/2013 | Outwater et al. | |
| 2014/0036989 A1* | 2/2014 | Heinrich | H04L 61/2007 375/238 |
| 2016/0307185 A1* | 10/2016 | Betancourt | G07F 13/00 |
| 2017/0313205 A1 | 11/2017 | Tseng et al. | |
| 2018/0308185 A1* | 10/2018 | Zhang | G06Q 20/127 |
| 2019/0039570 A1* | 2/2019 | Foster | G07C 9/00309 |
| 2019/0295189 A1* | 9/2019 | Strasser | G06Q 20/3224 |

* cited by examiner

*Primary Examiner* — Edward Chang
*Assistant Examiner* — William D Newlon
(74) *Attorney, Agent, or Firm* — Michael Spenner; Brooks Kushman PC

(57) ABSTRACT

A charging station comprises a processor programmed to receive a vehicle identifier identifying a vehicle from a first digital entity; receive a payment authentication from a second digital entity; electronically identify an account associated with the vehicle identifier and the payment authentication; verify payment rights confirming a right to use the account to pay; and responsive to successful verification, activate the charging station to charge and process payment from the account.

12 Claims, 4 Drawing Sheets

US 10,988,044 B2

AUTOMATIC PLUG-AND-PAY WITH MULTI-FACTOR AUTHENTICATION FOR FUELING VEHICLES

TECHNICAL FIELD

The present disclosure is generally related to fueling vehicles. More specifically, the present disclosure is related to a system for payment authentication for charging electrified vehicles.

BACKGROUND

Public charging stations for plug-in electrified vehicles/electric vehicles can vary significantly in their operation, user interface, and payment method. Charging stations may have different manufactures, and may be operation by different charge providers, each with a unique procedure for connecting to the charger, establish payment, initiating the charge, and informing the user of the charge progress.

SUMMARY

In one or more illustrative embodiments, a charging station comprises a processor programmed to receive a vehicle identifier identifying a vehicle from a first digital entity; receive a payment authentication from a second digital entity; electronically identify an account associated with the vehicle identifier and the payment authentication; verify payment rights confirming a right to use the account to pay; and responsive to successful verification, activate the charging station to charge and process payment from the account.

In one or more illustrative embodiments, a method for processing payment at a fueling station comprises receiving a vehicle identifier identifying the vehicle from a first digital entity; receiving a payment authentication from a second digital entity; electronically identifying an account associated with the vehicle identifier and payment authentication; verifying payment rights confirming the right to use the account to pay; and responsive to successful verification, activating to fuel the vehicle and processing payment from the account.

In one or more illustrative embodiments, a system comprises a processor programmed to electronically identify an account corresponding to both an identifier of a vehicle to be fueled and an authentication received from a mobile device authorized to the vehicle; responsive to successful verification of fueling rights for the vehicle using the account, activate a charging station.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes an authentication system for fueling vehicles. More specifically, the present disclosure proposes a multi-factor payment authentication system at an electrified vehicle fueling/charging station. Further aspects of the disclosure are discussed in detail herein.

Figure 1:
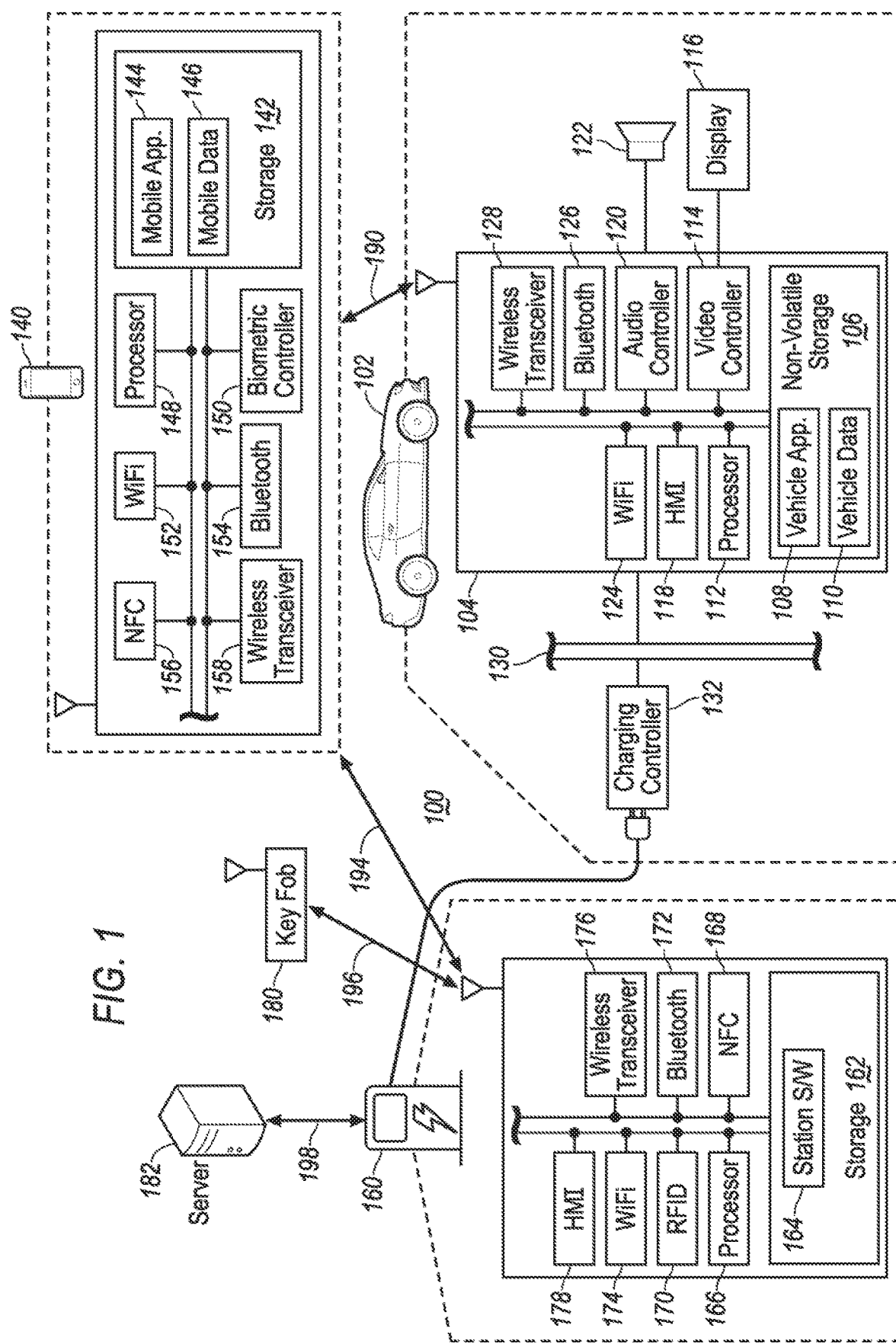
FIG. 1 illustrates an example block topology of a vehicle charging system of one embodiment of the present disclosure.

Referring to FIG. 1, an example block topology of a vehicle charging system 100 of one embodiment of the present disclosure is illustrated. The vehicle charging system 100 may generally include a vehicle 102, a mobile device 140 associated with the vehicle 102, a key fob 180 associated with the vehicle 102, and a charging station 160. It should be noted that the illustrated system 100 is merely an example, and more, fewer, and/or differently located elements may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an electric motor. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the vehicle 102 may include the SYNC system manufactured by The Ford Motor Company of Dearborn, Mich.

As illustrated in FIG. 1, a computing platform 104 of the vehicle 102 may include one or more processors 112 configured to perform instructions, commands, and other routines in support of the processes described herein. For instance, the computing platform 104 may be configured to execute instructions of vehicle applications 108 to provide features such as navigation, satellite radio decoding, and charging control. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls (e.g., steering wheel audio buttons, a push-to-talk button, instrument panel controls, etc.) configured to invoke functions on the computing platform 104 as well as other components of the vehicle 102.

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may be configured to communicate with a mobile device 140 of the vehicle user via a wireless connection 190. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 128 in communication with a Wi-Fi controller 124, a Bluetooth controller 126, and other controllers such as a Zigbee transceiver, an IrDA transceiver, an RFID transceiver (not shown), configured to communicate with a compatible wireless transceiver 158 of the mobile device 140.

The mobile device 140 may be provided with a processor 148 configured to perform instructions, commands, and other routines in support of the processes such as calling, wireless communication, multi-media processing and digital authentication. The mobile device 140 may include a wireless transceiver 158 in communication with a Wi-Fi controller 152, a Bluetooth controller 154, a near field communication (NFC) controller 156, and other controllers configured to communicate with the compatible wireless transceiver 128 of the computing platform 104.

The mobile device 140 may be provided with a biometric controller 150 configured to handle biometric information of a user such as fingerprint and facial recognition using a fingerprint reader and a camera (not shown). The biometric information collected through the biometric controller 150 may be processed by the processor 148 using compatible mobile applications 144 and stored in the storage 142 as a part of the mobile data 146.

The computing platform 104 may be further configured to communicate with a charging controller 132 via one or more in-vehicle network 130. The in-vehicle network 130 may include, but is not limited to, one or more of a controller area network (CAN), an Ethernet network, and a media oriented system transport (MOST), as some examples.

The charging controller 132 of the vehicle 102 may be configured to charging the vehicle battery (not shown) by receiving power from external sources. As an example, a charging cable 192 from a charging station 160 may be connected to the charging controller 132 to charge the vehicle battery. Alternatively, the charging controller 132 may be a wireless charger configured to receive power through a wireless charging pad (not shown). The charging cable 192 may be further provided with data communication capability. The charging controller 132 may be configured to communicate vehicle identification information, such as the vehicle identification number (VIN), to the charging station 160 via the charging cable 192 responsive to detecting the charging cable 192 is plugged in.

The charging station 160 may include one or more processors 166 configured to perform instructions, commands, and other routines in support of the processes described herein. As an example, the charging station 160 may be configured to execute instructions of station software 164 stored in a storage 162 to provide functions such as activating/deactivating charging, processing payment, wireless communication with various digital entities. The charging station 160 may be provided with HMI controls 178 configured to provide interaction with user.

The charging station 160 may include a wireless transceiver 176 in communication with a NFC controller 168, a radio-frequency identification (RFID) controller 170, a Bluetooth controller 172, a Wi-Fi controller 174, and other controllers configured to communicate with compatible wireless transceiver 158 of the mobile device 140. Additionally, the wireless transceiver 176 may be configured to communicate with a key fob 180 associate with the vehicle 102 via a wireless connection 196. The key fob 180 may be configured to support various wireless communication standards such as Bluetooth low energy (BLE), RFID, NFC or other short-range communication. The key fob 180 may be provided with storage capability to store information of the associate vehicle 102 such as the VIN, and communicate the vehicle information with the charging station 160 via the wireless connection 196. For security reasons, the vehicle information stored in the key fob 180 may be encrypted.

Figure 2:
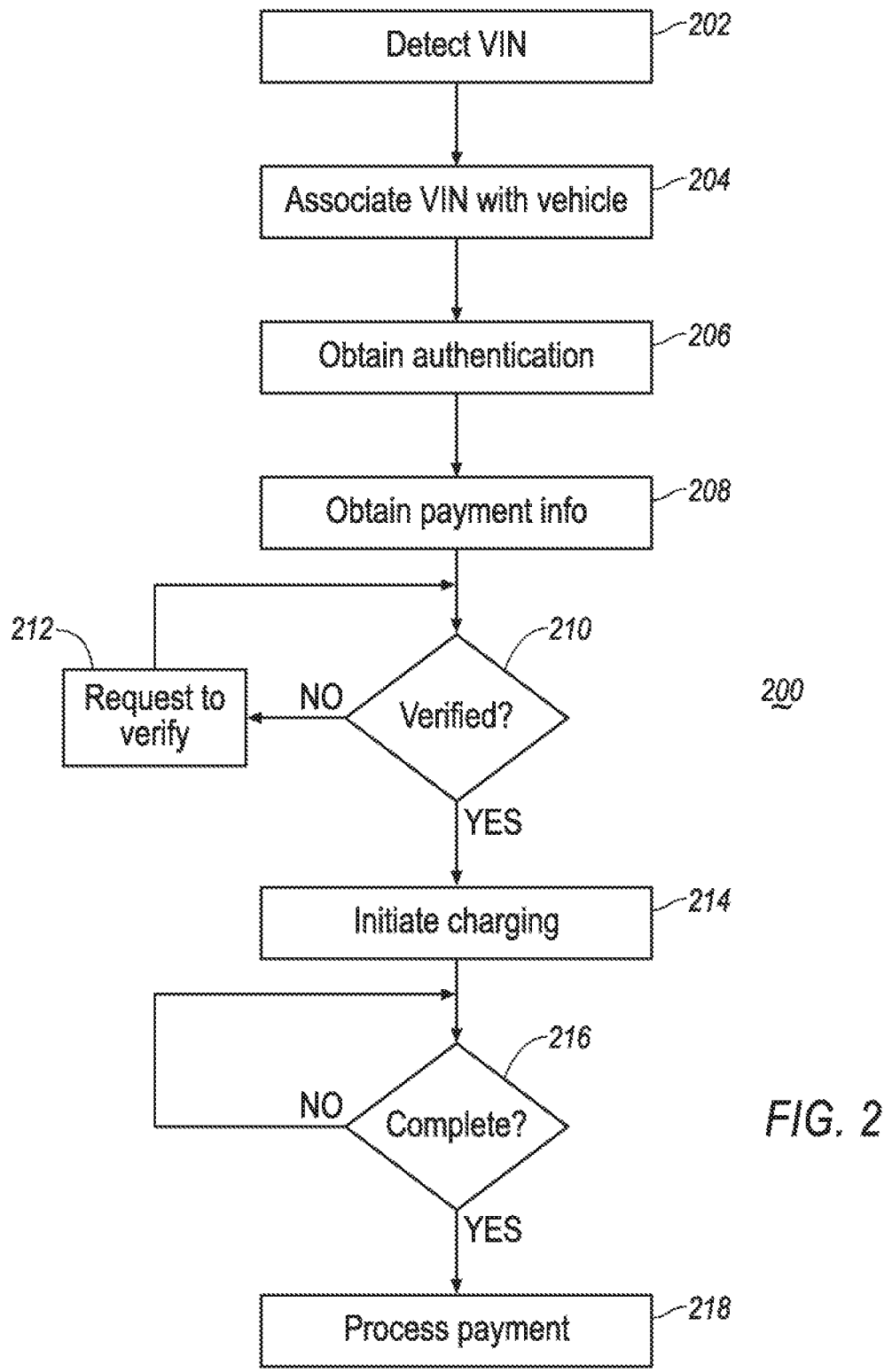
FIG. 2 illustrates an example flow diagram of one embodiment of the present disclosure.

Referring to FIG. 2, an example flow diagram for a process 200 for payment processing is illustrated. With continuing reference to FIG. 1, in this example, the process may be executed on the charging station 160 or a computer affiliated with the charging station 160. It is noted that although the process 200 is illustrated using an example for charging an electrified vehicle in the present embodiment, the process may also be applied to fueling vehicles powered by other energy types, such as traditional gasoline or diesel, or hydrogen fuel.

The process 200 begins at operation 202 by detecting a vehicle identification number (VIN). For instance, the detecting of the VIN may be performed in a wired manner through the charging cable 192 from the charging controller 132 of the vehicle 102. The charging controller 132 may be configured to send the VIN of the vehicle 102 to the charging station 160 responsive to detecting the charging cable 192 is connected. Alternatively, the operation 202 may be performed in a wireless manner using the key fob 180. The VIN may be stored on the key fob 180 and detected by the charging station 160 by means of BLE, RFID, NFC or other short-range communication. In general, short range is preferred, because it may help avoid the charging station 160 detecting VINs of vehicles 102 that are not intending to access the charging station 160.

Once the VIN has been detected, at operation 204, the charging station 160 associates with the specific vehicle 102 to be charged. This operation may be trivial for wired connections. However, if the charging station 160 detects multiple VINs wirelessly through key fobs, such as when multiple vehicles are at the vicinity of the charging station, the charging station 160 needs to identify which VIN is associated with the correct vehicle 102 to be charged. This may be performed using HMI controls 178 of the charging station 160 by offering the user options to choose the correct vehicle 102 to be charged. As an example, the HMI controls 178 may display all of the detected VIN on a display (not shown) and let the user to choose the correct one. Alternatively, the charging station 160 may present the options in a more intuitive manner by obtaining vehicle information (e.g. brand, model, vehicle color, and etc.) from the cloud using the VIN it detected, and letting the user to choose the vehicle brand and model instead of or in addition to the VIN. Alternatively, the charging station 160 may ask to user to perform some other operations (e.g. pressing a confirmation button via the HMI controls 118) to the proper vehicle 102 for identification. Alternatively, the charging station 160 may ask the user to plug in the charging cable 192 into the vehicle 102 to establish a wired connection to associate the VIN with the vehicle 102.

Responsive to the detecting the charging cable 192 is plugged in, the computing platform 104 of the vehicle 102 may be configured to send a push notification to the associated mobile device 140 to request to provide authentication. At operation 206, the charging station 160 obtains the payment authentication from the mobile device 140. For instance, the authentication may be obtained via the biometric controller 150. Responsive to receiving the push notification from the computing platform 104, the mobile device 140 may be configured to launch the authentication application (e.g., one of the mobile applications 144) to initiate the authentication. As an example, the user may be invited to use the biometric controller to complete the authentication. The user may be invited to put his/her previously registered finger on a fingerprint reader in communication with the biometric controller 150, and responsive to receiving the fingerprint data, the processor may analyze and compare it with previously collected fingerprint data stored in the storage as a part of the mobile data 146 to verify the identity of the user. To enhance the security, the previously-collected fingerprint data may be encrypted and stored in the biometric controller 150. Additionally or alternatively, other biometric identification technology (e.g. facial recognition) may be used. To further enhance the security, a multiple-factor authentication may be used instead of a single biometric authentication step. For instance, the mobile device 140 may be configured to ask the user to provide at least two authentication factors to authenticate the payment. Authentication factors may include various biometric factors as discussed above, a password, a personal identification number (PIN) and so on.

Following a successful payment authentication, at operation 206, the mobile device 140 may send the authentication to the charging station 160. For instance, the mobile device 140 may be configured to send the authentication via the wireless connection 194. The wireless connection 194 may be established by means of Wi-Fi, Bluetooth, NFC, or other communication.

At operation 208, the charging station 160 obtains payment information (e.g. an account number or other account information). The payment information may be obtained in several ways. The charging station 160 may obtain the payment information stored with respect to the VIN. Additionally, one vehicle may be associated with multiple payment information by different user authentications. The charging station 160 may further using the payment authentication obtained at operation 208 to identify the correct payment information. The payment information can be stored locally at the charging station or in a cloud based manner at a remote server 182. Alternatively, the charging station 160 may obtain the payment information from the mobile device 140. As an example, the mobile device 140 may be configured to support digital wallet functions such as Android Pay®, Apply Pay®, or Wechat Pay® to provide the payment information to the charging station 160.

Responsive to receiving the payment information, the charging station 160 verifies the payment information. The charging station 160 may verify the payment information at the remote server 182. If the payment information is successfully verified at operation 210, the process proceeds to operation 214. Otherwise, the charging station 160 sends a request to verify at operation 212 and continue to verify the payment information.

Responsive to a successful verification, at operation 214, the charging station 160 begins to charge the vehicle 102. Once the charging is complete at operation 216, the process submits a payment request to the identified payment account at operation 218.

The operation of the process 200 may be applied to various situations. In one example, a user pulls up to a charger station 160 in a vehicle 102, and engages the charger station 160 in some manner (e.g. approaches, activates, and etc.). Additionally or alternatively, the charging station 160 could sense the approach. The charging station 160 may then, for example, receive a wireless communication from a key fob 180 identifying the VIN. In another example, the VIN may be identified using the charging cable 192 once connected to the vehicle 102.

Once the VIN is obtained, the process may associate the VIN with the correct vehicle if there is some ambiguity due to for instance, multiple VINs are detected. The charging station 160 may let the user the select the correct vehicle 102 to be charged. Alternatively, the user may be asked to plug in the charger cable 192 for wired VIN association. After detecting the charging cable 192 is connection, or a signal indicating the user's intent to charge the vehicle (e.g., opening the charging port flap door), the vehicle 102 may send a push notification to the mobile device 140 of the user that has been previously associated to the computing platform 104 to request to authenticate that the user is authorized to pay. The user may authenticate the payment using a biometric device, such as a fingerprint reader on the mobile device 140 via the biometric controller 150, or alternatively using a password. The process may require multi-factor authentication by the user. Once successfully authenticated, the mobile device 140 sends the authentication to the charging station 160 using wireless connection 194 such as NFC.

Next, the charging station 160 obtains the payment information (e.g., account number) using the VIN from the cloud 182. If the vehicle 102 is often used by multiple users, each user may have his/her how payment information associated with the same vehicle 102. Therefore, the charging station 160 may further send the authentication information of the user to the cloud 182 to further identify the payment information. Alternatively, if the mobile device 140 support digital wallet functions, the user may user the digital wallet to make the payment. It is noted that many digital wallets require a separate authentication from the payment authentication discussed above. In this case, the above payment authentication step may be combined with the digital wallet authentication for the ease of use. Once the payment information is successfully verified, the charging station 160 starts to charge the vehicle 102 and process the payment.

Figure 3:
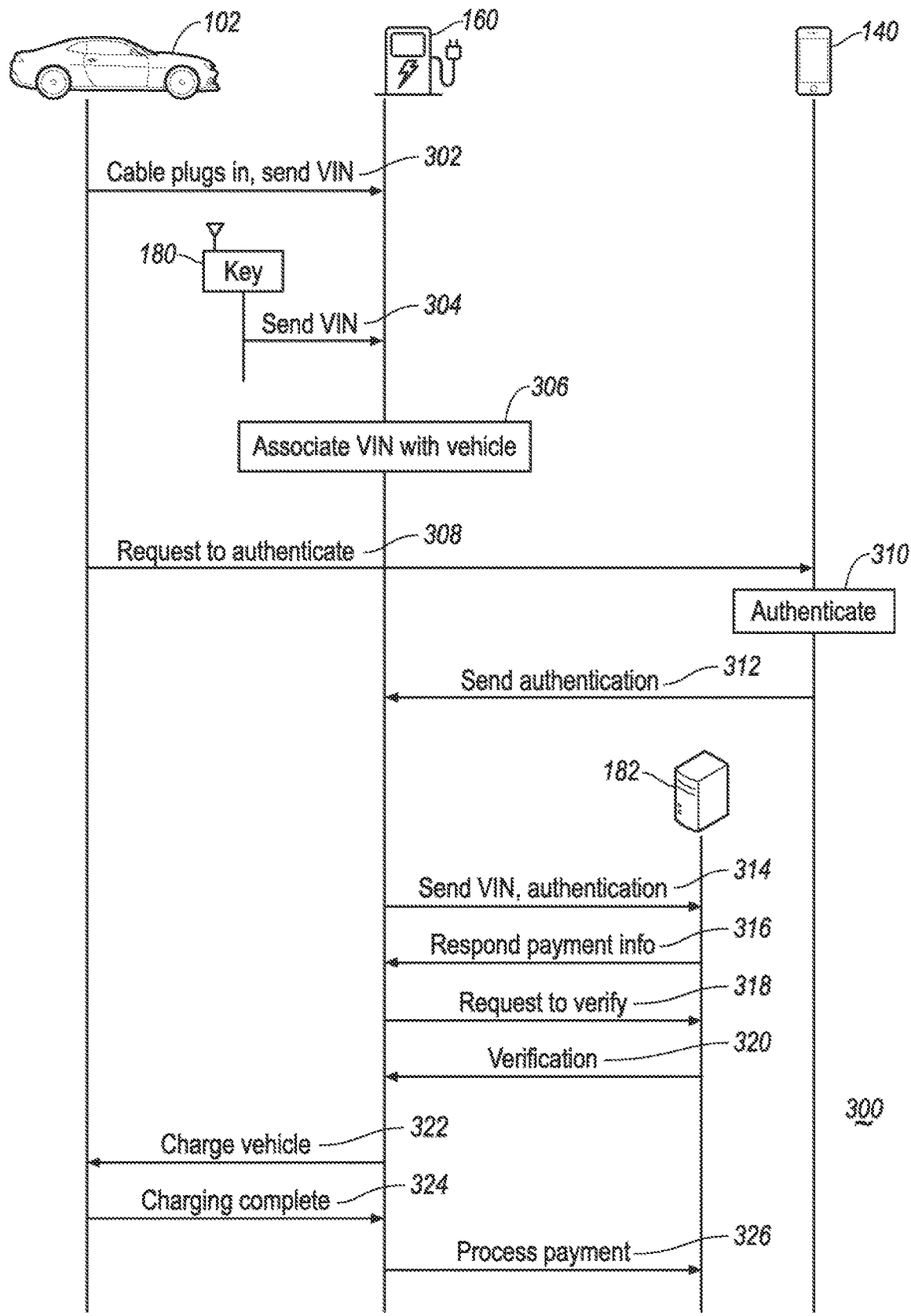
FIG. 3 illustrates an example data flow diagram of one embodiment of the present disclosure.

Referring to FIG. 3, an example data flow diagram 300 of one embodiment of the present disclosure is illustrated. With continuing reference to FIG. 1, at operation 302 the vehicle 102 detects the charging cable 192 is connected and sends the VIN to the charging station 160 in response. Additionally or alternatively, the VIN may be wirelessly sent from the key fob 180 to the charging station 160 at operation 304. At operation 306, the charging station 160 associates the VIN it received with the correct vehicle 102 to be charged. As discussed above with reference to FIG. 2, the charging station 160 may use HMI controls 178 to perform the association operation.

At operation 308, the vehicle 102 pushes a request to authenticate to the associated mobile device 140 responsive to the charging cable 192 being connected. Responsive to receiving the request to authenticate, the mobile device 140 launches the mobile application 144 and starts the authentication process at operation 310. The authentication may be performed by the processor 148 using biometric data collected from the biometric controller. Additionally or alternatively, other authentication factors such as passwords or PIN codes may also be used for authentication purposes. Responsive to a successful authentication, the mobile device 140 sends the authentication information to the charging station 160 at operation 312.

At operation 314, the charging station 160 sends the VIN received from the vehicle 102 or the key fob 180, and the authentication information received from the mobile device 140 to the remote server 182 to obtain the payment information. At operation 316, the remote server 182 retrieves the payment information with respect to the VIN and authentication information and send the payment information to the charging station.

If the payment information 318 has not been verified yet, at operation 318, the charging station 160 sends a request to verify payment information to the server 182. It is noted that the server 182 is merely a general term representative of cloud-based processing. The server 182 may be a single server or multiple servers located at the same or different locations to perform various operation of the process. At operation 320, the server 182 sends verification to the charging station after successfully verifying the payment. Alternatively, the verification process at operations 318 and 320 may be combined into operations 314 and 316 instead of being processed separately.

At operation 322, responsive to receiving the payment verification, the charging station 160 starts to charge the vehicle 102. After a successfully charging, the vehicle 102 sends a signal to the charging station 160 indicating the charging is complete. Responsive to the complete signal, the charging station 160 processes the payment to charge the correct amount of money from the user account. Alternatively, the payment may be processed upfront before the charging is complete. For example, the charging station 160 may deduct a fixed amount of money from the account and when the charging is complete and the correct charging price is calculated, refund the unused portion (or charge any additional portion) to the user account.

Figure 4:
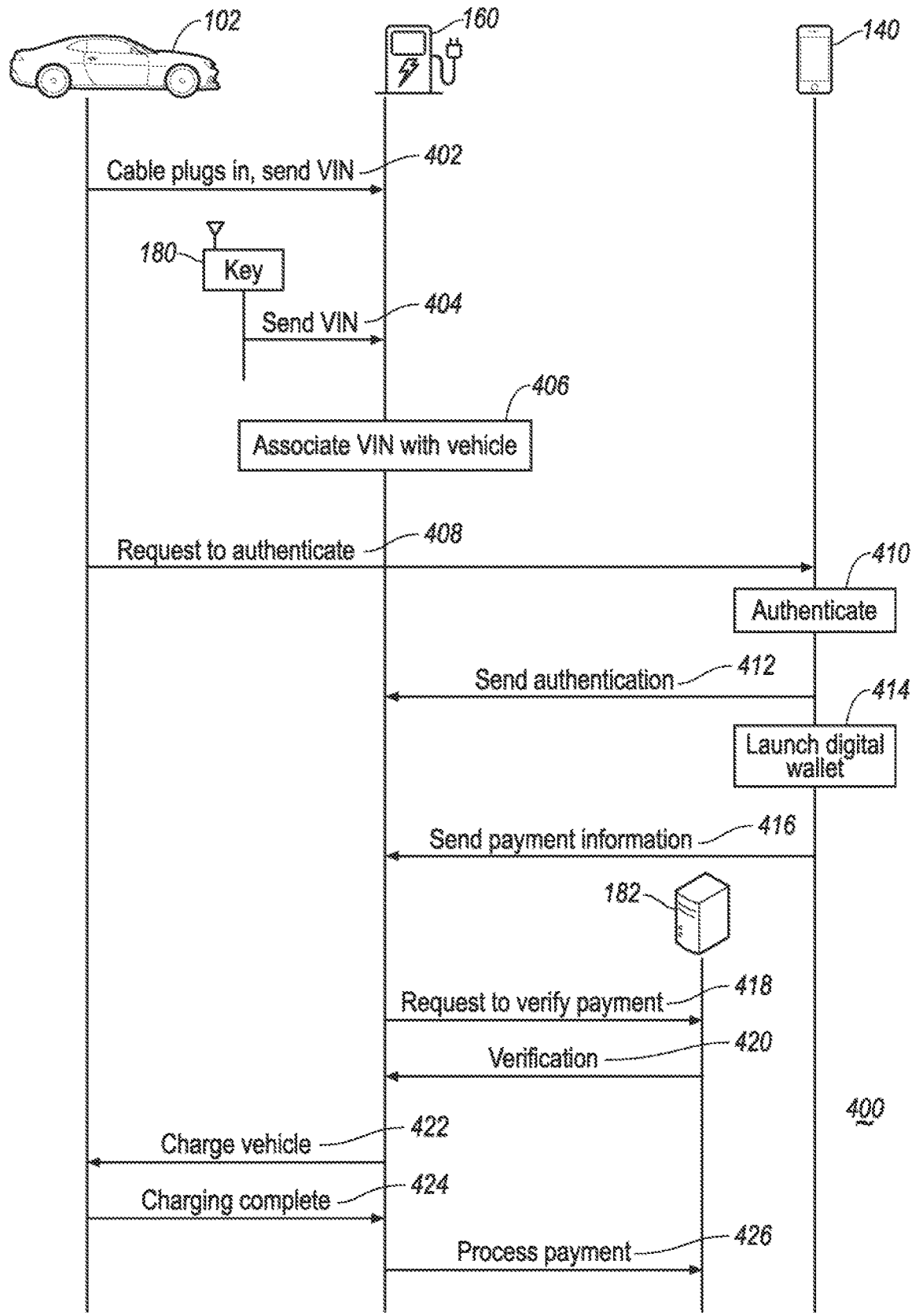
FIG. 4 illustrates an example data flow diagram of another embodiment of the present disclosure.

Referring to FIG. 4, an example data flow diagram 400 of another embodiment of the present disclosure is illustrated. Compared with the embodiment illustrated with reference to FIG. 3, the difference is the mobile device 140 in the present embodiment supports digital wallet functions.

Operations 402 to 412 are essentially the same as operation 302 to 312 as illustrated with reference to FIG. 3. At operation 414, the mobile device 140 launches a digital wallet application as a part of the mobile application 144 to process the digital payment. It is noted that many digital wallet applications require the user to provide additional authentication to proceed. For instance, the digital wallet may require the fingerprint, and/or facial image of the user to verify the identity of the user. In some cases, the digital wallet authentication may overlap with the authentication performed at operation 410. As an alternative example, to simplify the authentication process and enhance user experience, operations 410 and 414 may be combined into a single operation and the authentication may be only performed once.

After a successful digital wallet authentication, at operation 416 the mobile device 140 sends the payment information (e.g. account number) to the charging station 416 via the wireless connection (e.g. NFC connection). Responsive to receiving the payment information, the charging station 160 sends the payment information to the remote server 182 to verify. Operations 418 to 426 are essentially the same as operations 318 to 326 as illustrated with reference to FIG. 3.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging station comprising:
   a user interface device;
   a wireless transceiver; and
   a processor programmed to
   responsive to wirelessly receiving a unique vehicle identifier identifying a vehicle from a key fob associated with a vehicle, output a plurality of vehicle options via the user interface device, and connect to a mobile device via the wireless transceiver, the mobile device being wirelessly associated with the vehicle, wherein the plurality of vehicle options represent a plurality of vehicles detected by the charging station via the wireless transceiver,
   responsive to receiving a user input selecting the vehicle from the plurality of vehicle options, associate the charging station with the vehicle,
   send a request for payment authentication to the mobile device,
   receive a payment authentication, indicative of an approval by a user associated with the vehicle, from the mobile device via the wireless transceiver, electronically identify information of an account associated with the user associated with the vehicle using the vehicle identifier and the payment authentication, verify payment rights confirming a right to use the account to pay, and responsive to successful verification, start to provide electricity to the vehicle and to process payment from the account.

2. The charging station of claim 1, wherein the vehicle identifier sent from the wireless transceiver is encrypted, and the processor is further programmed to decrypt the encrypted vehicle identifier after receiving the vehicle identifier.

3. The charging station of claim 1, wherein the information of the account is obtained from a cloud-based server.

4. The charging station of claim 1, wherein the information of the account is obtained from the mobile device.

5. The charging station of claim 4, wherein the information of the account is encrypted, and the processor is further programmed to decrypt the encrypted information of the account.

6. A method for processing payment at a fueling station comprising:

receiving, via a wireless transceiver from a key fob associated with a vehicle, a message including a vehicle identifier identifying the vehicle and a mobile device identifier identifying a mobile device associated with the vehicle;

responsive to detecting a plurality of vehicles within a transmission range of the wireless transceiver, outputting, via an interface, a plurality of vehicle options representing the plurality of vehicles;

responsive to receiving a user input indicative of a selection of the vehicle from among the plurality of vehicle options, associating, via the controller, the fueling station with the vehicle;

responsive to detecting, via the wireless transceiver, the mobile device, connecting to the mobile device;

sending, via the wireless transceiver, a request for payment authentication to the mobile device as identified;

receiving, via the wireless transceiver, a payment authentication from the mobile device;

electronically identifying, via a controller, an account associated with the user associated with the vehicle according to the vehicle identifier and payment authentication;

verifying, via the controller, payment rights confirming the right to use the account to pay; and responsive to successful verification, starting to fuel the vehicle and processing payment from the account via a charging port.

7. The charging station of claim 1, wherein the processor is further programmed to obtain a brand and a model of the vehicle using the unique vehicle identifier via a server; and indicate the brand and model in a vehicle option of the plurality of vehicle options, the vehicle option corresponding to the vehicle.

8. The charging station of claim 1, wherein the payment authentication is generated responsive to receiving a user biometric input to the mobile device.

9. The method of claim 6, wherein the payment authentication is generated by the mobile device responsive to receiving a biometric input from a user, the biometric being indicative of user approval.

10. A vehicle charging station comprising:

a user interface device;

a wireless transceiver; and a processor programmed to:

responsive to wirelessly receiving a unique vehicle identifier identifying a vehicle from a mobile device operating as a key fob associated with the vehicle, output a plurality of vehicle options via the user interface device, and connect to the mobile device via the wireless transceiver, the mobile device being wirelessly associated with the vehicle, wherein the plurality of vehicle options represents a plurality of vehicles detected by the charging station via the wireless transceiver, responsive to receiving a user input selecting the vehicle from the plurality of vehicle options, associate the charging station with the vehicle, send a request for payment authentication to the mobile device, receive a payment authentication, indicative of an approval by a user associated with the vehicle, from the mobile device via the wireless transceiver, electronically identify information of an account associated with the user associated with the vehicle using the vehicle identifier and the payment authentication, verify payment rights confirming a right to use the account to pay, and responsive to successful verification, start to provide electricity to the vehicle and to process payment from the account.

11. The vehicle charging station of claim 10, wherein the processor is further programmed to obtain a brand and a model of the vehicle using the unique vehicle identifier via a server; and output the brand and model as one of the plurality of vehicle options via the user interface device.

12. The vehicle charging station of claim 10, wherein the payment authentication is generated responsive to receiving a user biometric input on the mobile device.

* * * * *